Figure 1:
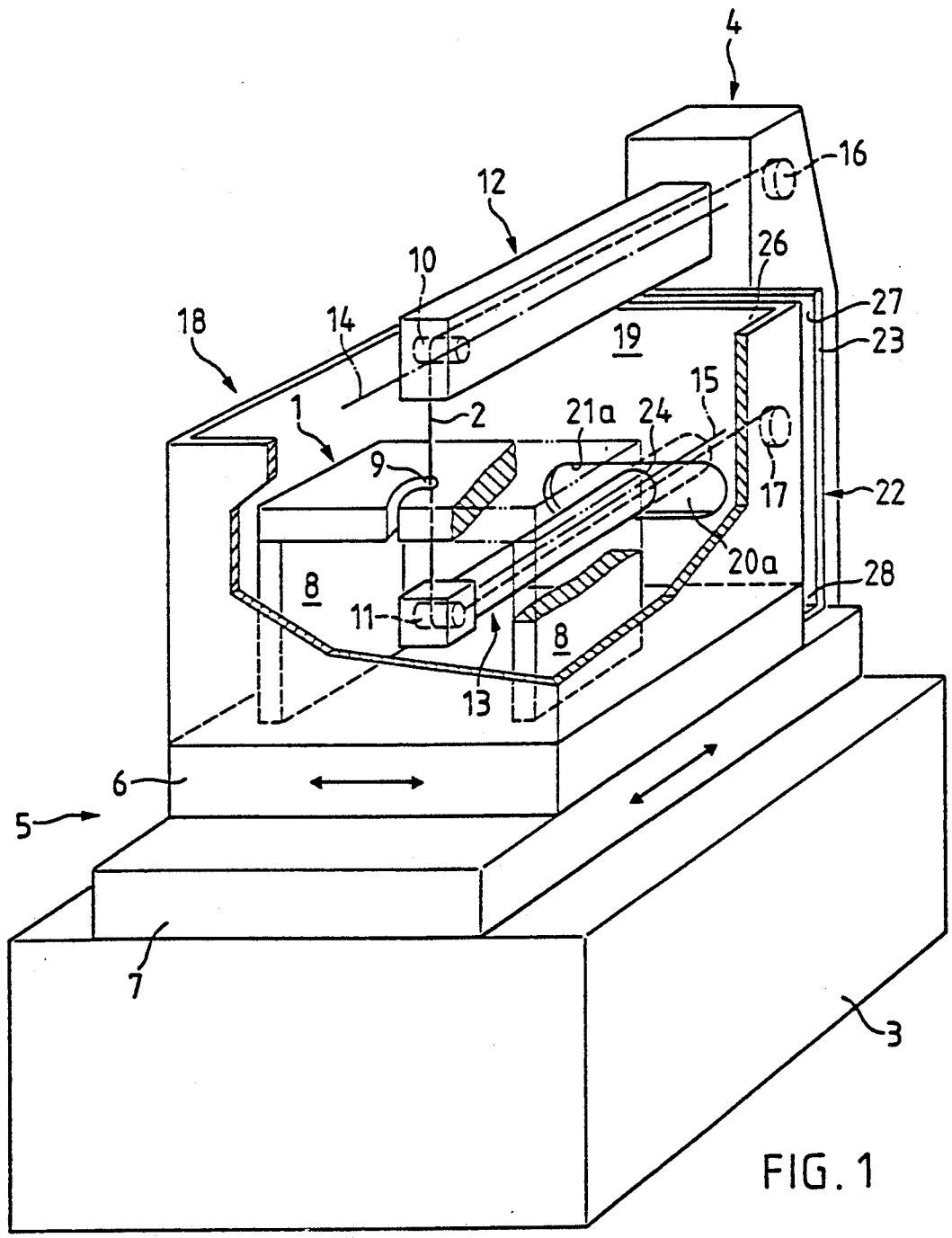

United States Patent [19]

Lodetti et al.

[11] Patent Number: 5,111,016
[45] Date of Patent: May 5, 1992

[54] MACHINE FOR SPARK EROSION CUTTING WITH A GUIDE-ARM CROSSING THE BACK WALL OF THE WORKING LIQUID CONTAINER

[75] Inventors: Attilio Lodetti, Losone; Brenno Medici, Peccia, both of Switzerland

[73] Assignee: Agie AG fur industrielle Elektronik, Losone, Switzerland

[21] Appl. No.: 710,029

[22] Filed: Jun. 3, 1991

[30] Foreign Application Priority Data

Jun. 20, 1990 [DE] Fed. Rep. of Germany ....... 4019662

[51] Int. Cl.⁵ .............................................. B23H 7/02
[52] U.S. Cl. .................. 219/69.12; 219/69.14
[58] Field of Search ............................ 219/69.12, 69.14; 204/224 M

[56] References Cited

U.S. PATENT DOCUMENTS

| | | | |
|---|---|---|---|
| 4,565,915 | 1/1986 | Girardin | 219/69.12 |
| 4,647,747 | 3/1987 | Goto | 219/69.12 |
| 4,808,786 | 2/1989 | Shinkai et al. | 219/69.12 |
| 4,918,279 | 4/1990 | Babel et al. | 219/69.12 |
| 4,992,640 | 2/1991 | Tanaka et al. | 219/69.12 |
| 5,028,757 | 7/1991 | Aramaki et al. | 219/69.12 |

FOREIGN PATENT DOCUMENTS

| | | | |
|---|---|---|---|
| 1-264721 | 10/1989 | Japan | 219/69.12 |
| 1-306130 | 12/1989 | Japan | 219/69.14 |

Primary Examiner—Geoffrey S. Evans
Attorney, Agent, or Firm—EGLI International

[57] ABSTRACT

A workpiece (1) is clamped onto a compound rest table (5) and machined by a tool electrode (2) running tensioned between two electrode guides (10, 11). A container (18) holds the working liquid into which a working zone (9) of the workpiece (1) is immersed. The lower electrode guide (1) is supported on the stand (4) of the machine by means of a guidearm (13). The guidearm (13) crosses the back wall (19) of a container (18) at a right angle in an opening (21a) covered by a sliding closing piece (22) that is parallel to the back wall (19) of the container (18). The guide-arm (13) crosses the closing piece (22) of the container (18) at a right angle in another opening (24) where it is slidable. The closing piece (22) is arranged at the outside of the container (18) on a side (26) of the back wall (19) facing the stand (4). On the compound rest table (5) the lower slide (7) is rigidly connected to the closing piece (22), preferably by a duct (28), and in relation to the stand (4) it can be moved only parallel to the longitudinal axis (15) of the guide-arm (13) whereas in relation to the lower slide (7) the upper slide (6) can only be moved at a right angle to the longitudinal axis (15) of the guide-arm (13).

10 Claims, 5 Drawing Sheets

MACHINE FOR SPARK EROSION CUTTING WITH A GUIDE-ARM CROSSING THE BACK WALL OF THE WORKING LIQUID CONTAINER

The invention relates to a machine for spark erosion cutting of a workpiece clamped onto a compound rest table of the machine, in a working zone by means of a wire-shaped or ribbon-shaped tool electrode running tensioned between an upper and a lower electrode guide, the machine being provided with a container for an operating liquid that surrounds at least the working zone of the workpiece, the lower electrode guide being supported on a stand of the machine by means of an elongated guide-arm with a horizontal longitudinal axis, the compound rest table being provided with two slides lying crosswise on top of one another for sliding the workpiece in relation to the stand as desired parallel to the longitudinal axis of the guide-arm and in the horizontal direction orthogonal thereto, the container having an essentially flat, vertical back wall facing the stand and having an opening confined by a rim, the guide-arm crossing this back wall of the container at the location of the opening in the direction of its longitudinal axis at a right angle, the rim of the opening of the back wall enclosing the guide-arm and being spaced therefrom, the container being provided with an essentially plate-shaped closing piece that is parallel to the back wall, slidable on it and permanently covering the opening of the back wall, the closing piece having another opening confined by another rim, this other rim of the other opening provided in the closing piece enclosing the guide-arm in such manner that it can be slid in the direction of the longitudinal axis of the guide-arm, first sealing means being provided for establishing a slidable sealing between the closing piece and the back wall, second sealing means being provided for establishing a slidable sealing between the guidearm and the closing piece, and the uppermost of the two slides being rigidly connected with a chucking fixture for the workpiece and with the back wall of the container.

A machine of this type is known from EP-0133160 or U.S. Pat. No. 4,565,915. It is a disadvantage of this machine that the forces necessary for the movement of the closing piece act on the guide-arm at a right angle to its longitudinal axis thus bending the guide-arm at a right angle to its longitudinal axis and at the same time impairing workpiece machining precision. In addition, it is another disadvantage of the machine known from EP-0133160 or U.S. Pat. No. 4,565,915 that it is necessary to guarantee the guidance of the closing piece at the back wall of the container so that this back wall is rather costly since it has to be either double-walled or provided with guiding rails.

It is known that in order to achieve high precision for the machining of the workpiece it is necessary to arrange the entire lower guide-arm together with the electrode guide as well as the workpiece and at least the final part of the upper guide-arm together with the upper electrode guide in the container in such manner that these parts can be immersed in the working liquid. Such a suggestion is known from U.S. Pat. No. 4,029,929 or U.S. Pat. No. 4,363,949, however, the suggested solution is disadvantageous insofar as the lower guide-arm cannot be supported directly on the stand in an adequate manner, which impairs precision and also prevents (U.S. Pat. No. 4,029,929) or makes it complicated (U.S. Pat. No. 4,363,949) to move the two electrode guides independently from one another.

A suggestion known from EP-0264716 or U.S. Pat. No. 4,808,786 provides to have the guide-arm go through the back wall of the container and to establish the sealing between the guide-arm and the back wall by means of a flexible closing piece designed as bellows. It is a disadvantage that such a bellows does not resist the pressure of the working liquid if the container is filled with working liquid.

A suggestion known from U.S. Pat. No. 4,647,747 or U.S. Pat. No. 4,663,509 provides to have the guide-arm go through the back wall of the container and to establish the sealing between guide-arm and back wall by means of a horizontally movable, flexible closing piece designed as ribbon that can be unrolled or rolled up at its ends. It is a disadvantage that such a closing piece functioning like a double-sided shutter is very complicated and costly.

It is an object of the invention to overcome the mentioned disadvantages and, in particular, to suggest a comfortable and economical solution for ensuring, in a machine of the kind mentioned at the preamble, that the forces necessary for the movement of the closing piece in no way whatsoever will act on the guide-arm at a right angle to its longitudinal axis, thus aiming at enabling high-precision machining of the workpiece, while the sealing of the closing piece at the back wall of the container is to be established so that the guide-arm can be supported on the stand in an optimum manner and the container can be filled completely with working liquid.

According to the invention, this object is attained in a machine of the kind mentioned at the preamble which is characterized in that the closing piece is arranged outside of the container on a side of the back wall facing the stand, the lower of the two slides is connected rigidly with the closing piece and in relation to the stand can only be moved parallel to the longitudinal axis of the guide-arm, and in relation to the lower slide the upper slide can only be moved at a right angle to the longitudinal axis of the guide-arm.

It is an essential advantage of the machine according to the invention that the forces necessary for the movement of the closing piece in no way whatsoever act on the guide-arm at a right angle to its longitudinal axis, thus enabling high-precision machining.

For supplementing the sealing, the closing piece can preferably be provided with a duct in its lower section on its side facing the container, which is provided with a drainage connection piece. In this context, the duct can preferably be designed as a connecting element rigidly supporting the closing piece on the lower slide.

For establishing the slidable sealing between the closing piece and the back wall, the first sealing means may preferably include at least two sealing pieces arranged spaced from one another. In this context at least one sealing piece may preferably be inflated by gas pressure. Furthermore several sealing parts may be each connected integrally with a sealing body and fitted to it as a curved projection, and the sealing body together with the sealing pieces (34) fitted to it may preferably constitute a labyrinth seal.

It is an advantage that by means of these additional measures sealing between the closing piece and the back wall is ensured through simple and economical means.

For establishing a slidable sealing between the guide-arm and the closing piece, in a first embodiment the second sealing means may preferably include at least one bellows embracing the guide-arm at least on part of its length, one end of the bellows being sealingly connected with the guide-arm and the other end of the bellows with the closing piece.

For establishing a slidable sealing between the guide-arm and the closing piece, in a second embodiment the second sealing means may preferably include a sleeve arranged fixedly on a side of the closing piece facing the stand and embracing the guide-arm with play, and at least two sealing pieces arranged in the sleeve spaced from one another and embracing the guide-arm in a sealing and slidable manner, the sleeve cooperating at least with the two sealing pieces and the guide-arm in order to define a sealing space enclosing the guide-arm. In this context, gas pressure may preferably be applied to the sealing space.

Of these two embodiments of the second sealing means the one or the other can be used, however, this does not mean that both embodiments cannot be used jointly, supplementing one another.

It is an advantage that by means of these additional measures a sealing between the guide-arm and the closing piece is ensured that can be produced and installed without great difficulty and expense.

The invention will be set forth hereinafter in further detail by means of examples of embodiments making reference to the drawing, same parts having same reference signs throughout all figures.

Figure 2:
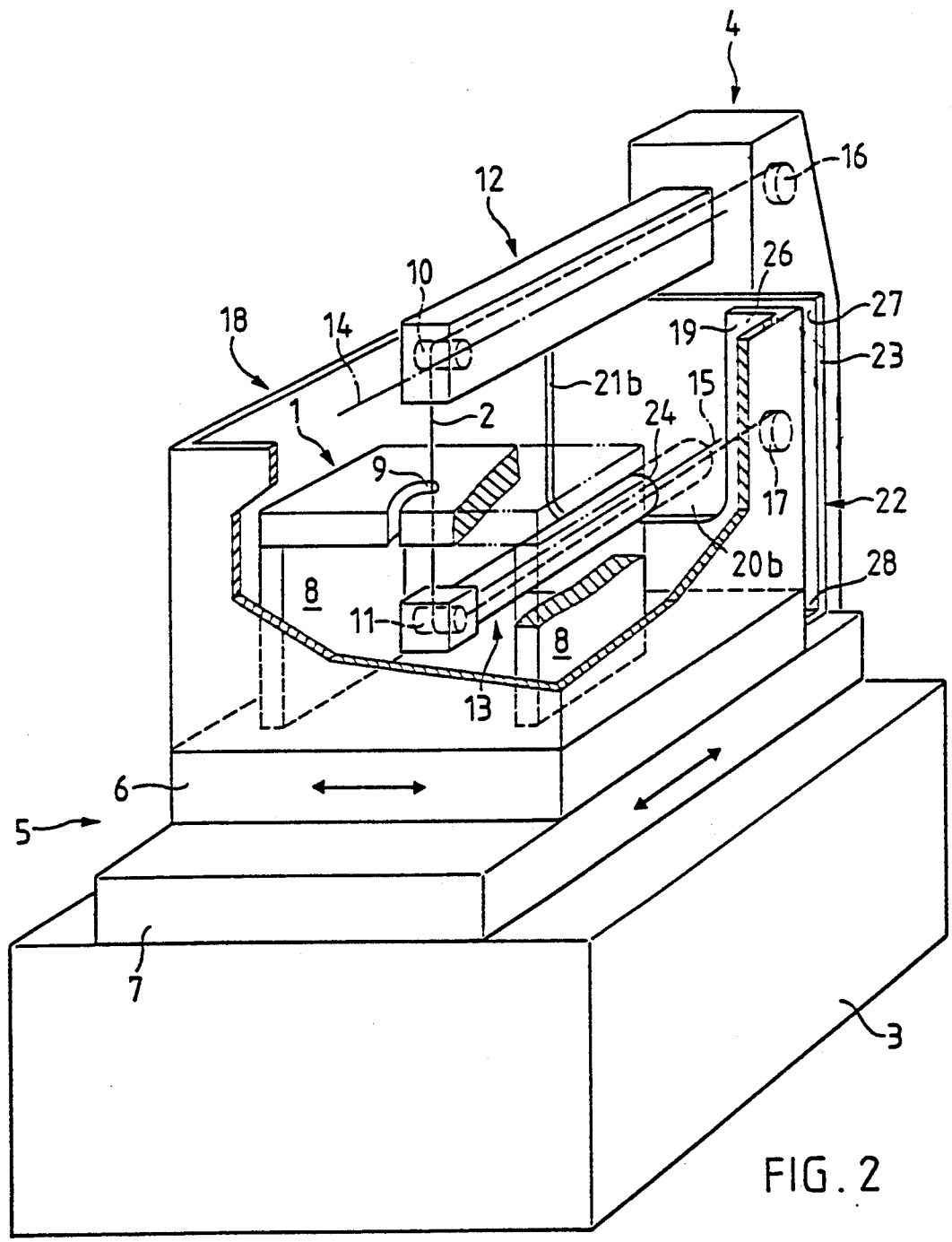
Figure 3:
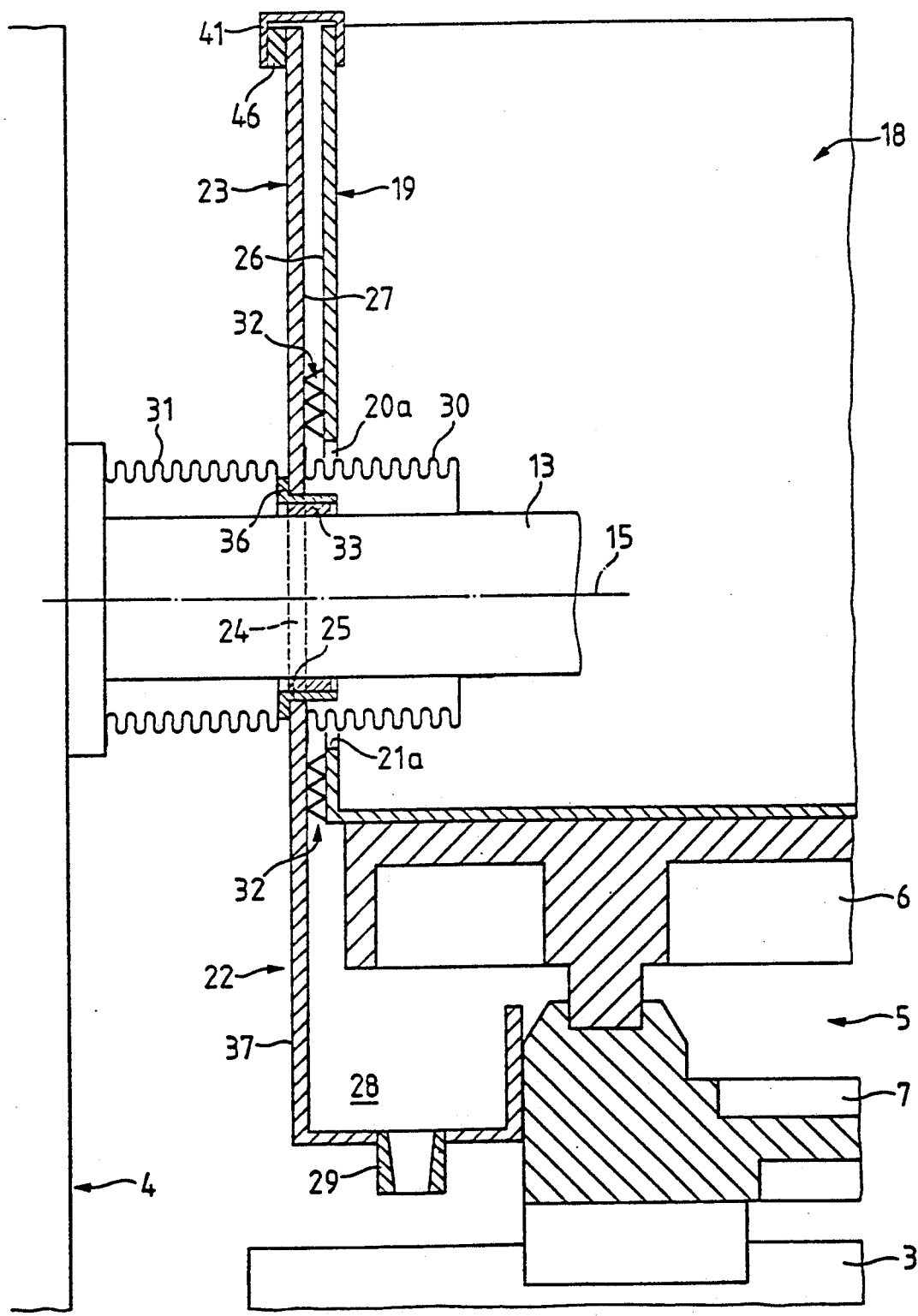
Figure 4:
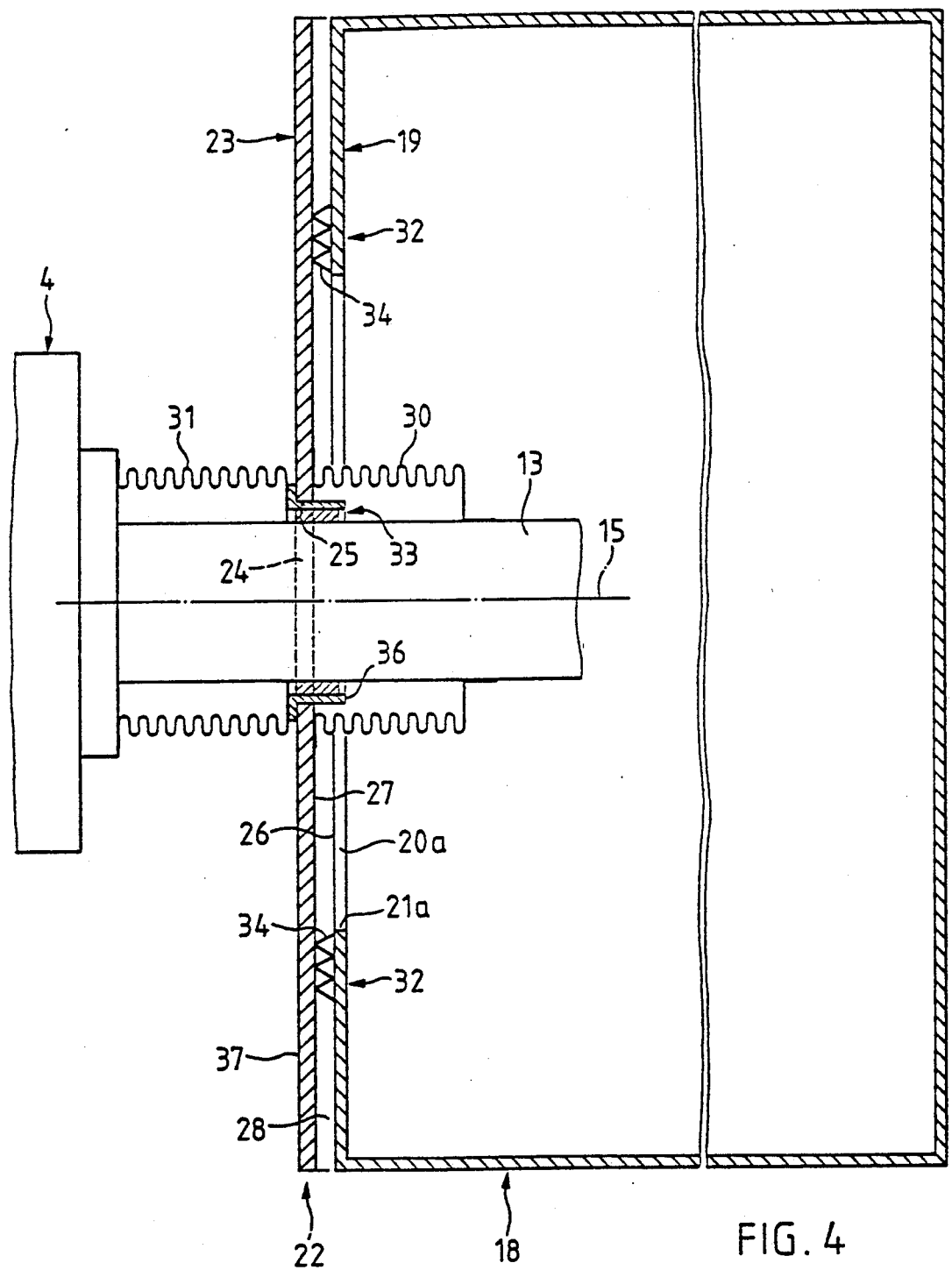
Figure 5:
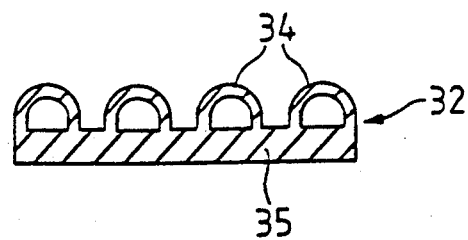
Figure 7:
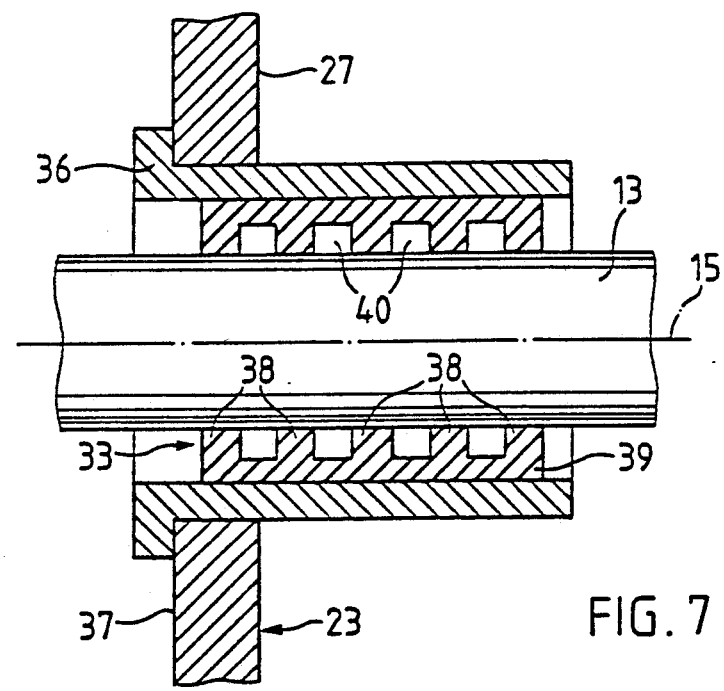
Figure 6:
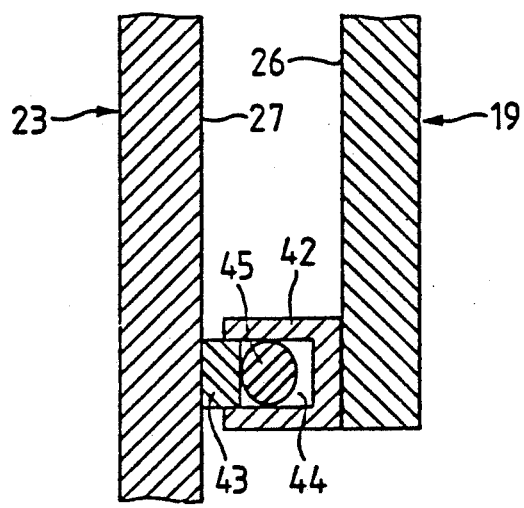

FIG. 1 shows a diagrammatic perspective view of a first embodiment of a machine according to the invention and with partly broken-up parts, FIG. 2 shows a diagrammatic perspective view of a first embodiment of a machine according to the invention and with partly broken-up parts, FIG. 3 shows a diagrammatic and partial lateral view of the embodiment of FIG. 1 in a vertical longitudinal section across the lower guide-arm and in the corresponding section across the container, FIG. 4 shows a diagrammatic and partial top view of the embodiment of FIG. 1 in a horizontal longitudinal section across the guide-arm and in the corresponding FIG. 5 shows a diagrammatic cross-section representation of a first example of the second sealing means, FIG. 6 shows a diagrammatic cross-section representation of a second example of the second sealing means, as cross-section, and FIG. 7 shows a diagrammatic representation of the second sealing means, in a horizontal longitudinal section across the guide-arm.

A machine, according to the invention, for spark erosion cutting of a workpiece 1 by means of a wire- or ribbon-shaped tool electrode 2 includes a machine bed 3 and a stand 4. On the machine bed 3 a compound rest table 5 is arranged being provided with two slides 6, 7 lying crosswise on top of one another. The upper slide 6 is provided with a chucking fixture 8 for the workpiece 1 and it is supported on the lower slide 6 in a slidable and adjustable manner. The lower slide in its turn is supported on the machine bed 3 in a slidable and adjustable manner.

The tool electrode 2 runs across a working zone 9 of the workpiece 1 clamped onto the compound rest table 5. For this purpose, the tool electrode 2 runs tensioned between an upper electrode guide 10 located above the workpiece 1 and a lower electrode guide 11 located below the workpiece. By means of an upper guide-arm 12 the upper electrode guide 10, and by means of a lower guide-arm 13 the lower electrode guide 11 is supported on the stand 4. In the embodiments represented in FIG. 1 and 2 the two guide-arms 12 and 13 are designed elongated and having a horizontal longitudinal axis 14 and 15, in other embodiments at least the lower guide-arm 13 is designed in this way. The tool electrode 2 is unrolled from a supply coil, deflected by at least one upper roller 16 from where it is led in succession to the upper electrode guide 10, the working zone 9 and the lower electrode guide 11, whereupon it will be deflected by at least one lower roller 17 and accommodated in a not represented manner, for example, rolled up or chopped up.

On the compound rest table 5 the sliding direction of the lower slide 7 is oriented parallel to the horizontal longitudinal axis 15 of the lower guide-arm 13, while the sliding direction of the upper slide 6 is oriented horizontal orthogonally to this longitudinal axis 15. Thus, in relation to the stand 4 the lower slide 7 can only be moved parallel to the longitudinal axis 15 of the guide-arm 13 and the upper slide 6 in relation to the lower slide can only be moved at a right angle to the longitudinal axis 15 of the guide-arm 13, while in relation to the stand 4 the workpiece 1 may be moved by means of the compound rest table 5 invariably in a horizontal plane but optionally into the direction parallel to the longitudinal axis 15 of the upper guide-arm 13 and into the relevant orthogonal, horizontal direction, and into any combination of these directions.

The machine is provided with a container 18 for a working liquid. The container 18 is supported on the upper slide 6 and encloses the chucking fixture 8 in such manner that the workpiece 1 or at least its working zone 9 will be immersed in the working liquid when the container 18 is filled with working liquid. The container 18 has an essentially flat, vertical back wall 19 facing the stand 4 and rigidly connected with the upper slide 6.

In order to bring the tool electrode 2 to the working zone 9, the lower guide-arm 13 crosses this back wall 19 of the container 18 into the direction of its longitudinal axis 15 at a right angle in the range of an opening 20a (FIG. 1) or 20b (FIG. 2). The opening 20a or 20b is confined by a rim 21a (FIG. 1) or 21b (FIG. 2) enclosing the lower guide-arm 13 spaced therefrom. In the embodiment according to FIG. 1 the rim 21a of the opening 20a possesses the geometric shape of a continually convex, closed curve which corresponds, for example, to a rectangle extended by means of semicircles added to its vertical, short sides. In the embodiment according to FIGS. 2 and 3, the rim 21b of the opening 20b possesses the geometric shape of a U-shaped curve segment, which can be deduced from the geometric form of the rim 21a of the opening 20a in FIG. 1, by removing the part of the back wall 19 of the container 18 that is located above the opening 20a. FIG. 4, however, is applicable to both embodiments.

Thus, both embodiments offer the possibility to move the lower guide-arm 13 at a right angle to its longitudinal axis 15 in the opening 20a or 20b and in relation to the back wall 19 within the limits determined by the rim 21a or 21b.

In order to prevent the working liquid from flowing out container 18 through the opening 20a or 20b, a closing piece 22 is provided at the container 18, which at least in the range of the opening 20a or 20b is of essentially plateshaped design. This plate member 23 of the closing piece 22 is, as shown particularly in FIGS. 3 and 4, arranged and slidable at the outside of the container 18 and parallel and at a minimal distance from a side 26 of the back wall 19 facing the stand 4. The entire closing piece 22 is, as shown particularly in FIG. 3, rigidly connected with the lower slide 7.

The dimensions of the plate member 23 have been chosen in such manner that it will always cover the opening 20a or 20b of the back wall 19, i.e. in any displaced position. In the horizontal direction this is achieved by the plate member 23 and the back wall 19 having about the same horizontal extension and this horizontal extension being greater than the greatest horizontal width of the opening 20a or 20b by at least two times the diameter of the lower guide-arm 13, as shown particularly in FIG. 4. In the vertical direction, this is achieved by the plate member 23 in the embodiment according to FIG. 1 being greater by at least two times the diameter, and in the embodiment according to FIGS. 2 and 3 by at least one time, of the lower guide-arm 13 than the greatest vertical width of the opening 20a. For establishing a slidable sealing between the closing piece 22 and the back wall 19, first sealing means 32 are provided which will be described hereinafter.

It is a crucial advantage of the embodiments according to FIGS. 1 and 2 that the forces required for the movement of the closing piece do in no way whatsoever act on the guide-arm at the right angle to its longitudinal axis, thus enabling high-precision machining of the workpiece.

It is yet another advantage of the embodiment according to FIG. 1 that the production of the back wall 19 of the container 18 and, as will be shown hereinafter, of the first sealing means 32 is particularly economical, while it is another advantage of the embodiment according to FIG. 2 that it is very easy to insert the guide-arm 13 into the container 18.

In order to bring the tool electrode 2 to the working zone 9, the lower guide-arm 13 crosses the plate member 23 of the closing piece 22 into the direction of its longitudinal axis 15 at a right angle in the range of another opening 24 in the plate member 23 of the closing piece 22. This other opening 24 is confined by another rim 25 enclosing the lower guide-arm 13 in such manner that it is sealing and movable in the direction of its longitudinal axis 13. For establishing a slidable sealing between the lower guide-arm 13 and the closing piece 22 second sealing means are provided which will be described in further detail hereinafter.

For the slidable sealing between the closing piece 22 and the back wall 19, in a first embodiment represented in FIG. 5 the first sealing means 32 include at least two or, as in the represented embodiments, four sealing pieces 34 arranged spaced from one another which are diagrammatically implied in FIG. 4 and diagrammatically represented in FIG. 5 in a larger and sectional fashion. Yet it may be sufficient if the first sealing means 32 include two sealing pieces 34. The sealing pieces 34 are of tube-shaped design and may be inflated by gas or air pressure (this is not represented, since such seals are known per se). Yet it may be sufficient if only one or some of the sealing pieces 34 are of inflatable design. As can be seen in FIG. 5, the four sealing pieces 34 are integrally connected with a sealing body 35 and fitted to it as curved projection. Together with the sealing pieces 34 fitted to it, the sealing body 35 constitutes a labyrinth seal made of elastic synthetic material that is commonly used for sealing purposes.

This labyrinth seal 34, 35 possesses a geometric shape corresponding to the geometric shape of the rim 21a or 21b of the opening 20a or 20b (FIG. 1 or FIG. 2). In the embodiment according to FIG. 1, the labyrinth seal 34, 35 has the geometric shape of a continually convex, closed curve just like the rim 21a of the opening 20a, while in the embodiment according to FIGS. 2 and 3 it has the geometric shape of a U-shaped curve segment just like the rim 21b of the opening 20b.

For establishing the slidable sealing between the closing piece 22 and the back wall 19 in a second embodiment represented in FIG. 6 the first sealing means 32 include a U-section 42 arranged on the side 26 of the back wall 19 facing the stand 4. Hence, this U-section 42 is located between the side 26 of the back wall 19 facing the stand 4 and the side 27 of the plate member 23 of the closing piece 22 facing the container 18. A sliding piece 43, for example with a rectangular cross-section, is set at least partly into the U-section 42. The sliding piece 43 can for example be made of a PTFE matrix charged with graphite and establishes a slidable sealing on the side 27 of the plate member 23 when it is pressed onto it. The part of the sliding piece 43 set into the U-section 42 defines a cavity 44 in the U-section 42 into which a seal is inserted. Into the cavity 44 remaining between the U-section 42 and the seal 45 compressed air may be fed in a manner herein not represented. Due to this pneumatic pressure a force will act on the seal 45 in the direction of the closing piece 22. This causes the seal 45 to be pressed onto the sliding piece 43 and this in turn onto the side 27 of the plate member 23 of the closing piece 22. In this manner the container 18 will be slidably sealed at the closing piece 22.

As a supplement to the first sealing means 32, in its lower section the closing piece 22 on its side 27 facing the container 18 is provided with a duct 28 collecting the working liquid which might possibly leak through the sealing means 32. Simultaneously, this duct 28 functions as connecting element for the rigid support of the plate member 23 and thus of the entire closing piece 22 on the lower slide 7. For draining the working liquid that might have possibly been collected, the duct 28 is provided with a drainage connection piece 29 connected with herein not represented conduits for the draining of the working liquid.

For establishing the sealing in a first embodiment represented in FIGS. 3 and 4, the second sealing means may include an interior bellows 30 and/or an exterior bellows 31 embracing the guide-arm 13 for at least part of its length. One end of the bellows 30 and/or 31 is connected with the guide-arm 13, for example by glue or yet by tight chucking, in a sealing manner. The other end of the bellows 30 and/or 31 is connected with the closing piece 22, for example by glueing or by means of a not represented flange screwed onto the closing piece 22, in a sealing manner. For draining the working liquid that might possibly have been collected in the bellows 30 and/or 31, means that are known per se and therefore not represented such as drainage connection pieces are provided, which are connected with not represented conduits for the draining of the working liquid.

For establishing the sealing in a second embodiment also represented in FIGS. 3 and 4, the second sealing means can be designed as sealing device 33 arranged between the guide-arm 13 and the closing piece 22. This sealing device 33 includes a sleeve 36 rigidly arranged on a side 37 of the closing piece 22 facing the stand 4 by screws or glue. The sleeve 36 encloses the guide-arm 13 with play, in order to provide space for at least two sealing pieces 38 arranged within the sleeve 36 spaced from one another and sealing and slidably embracing the guide-arm 13. For example, and as represented in FIG. 7 in a sectional diagram, five annular sealing pieces 38 are provided which are integrally connected with a sealing body 39 and fitted to it as annular inner projection. The annular sealing pieces 38 enclose the guide-arm 13 in a sealing and slidable manner. In this context, a sealing space 40 is defined between the guide-arm 13, the sealing body 39 supported on the sleeve 36 and one pair of sealings pieces 38 each, which encloses the guide-arm 13 and onto which gas pressure can be applied (this is not represented in further detail, since such seals onto which gas pressure can be applied are known per se). Together with the sealing pieces 38 fitted to it, the sealing body 39 constitutes a labyrinth seal known per se and made of a synthetic material commonly used for sealing purposes.

For the supplementary support of the plate member 23 of the closing piece 22 on the container 18, a U-shaped bracket 41 can hold the plate member 23 at the back wall 19 of the container 18. The bracket 41 is attached to the back wall 19 of the container 18, for example by screws or glue, and allows the sliding-by of the plate member 23, for example by means of a sliding body 46 made of low-friction, elastic synthetic material that may, for example, contain graphite.

Generally, the modifications and variations of the invention are in no way whatsoever limited to the embodiments set forth hereinabove which were given by way of example only. Many equivalent embodiments are possible whose development will fall within the scope of the invention.

We claim:

1. A machine for spark erosion cutting of a workpiece (1) clamped onto a compound rest table (5) of the machine in a working zone (9) thereof, by means of a wire-shaped or ribbon-shaped tool electrode (2) running tensioned between an upper and a lower electrode guide (10, 11), the machine being provided with a container (18) for a working liquid that surrounds at least the working zone (9) of the workpiece (1), the lower electrode guide (11) being supported on a stand (4) of the machine by means of an elongated guide-arm (13) with a horizontal longitudinal axis (15), the compound rest table (5) being provided with two slides (6, 7) lying crosswise on top of one another for sliding the workpiece (1) in relation to the stand (4) as desired parallel to the longitudinal axis (15) of the guide-arm (13) and in the horizontal direction orthogonal thereto, the container (18) having an essentially flat, vertical back wall (19) facing the stand (4) and having an opening (20a, 20b) confined by a rim (21a, 21b), the guide-arm (13) crossing this back wall (19) of the container (18) at the location of the opening (20a, 20b) in the direction of its longitudinal axis (15) at a right angle, the rim (21a, 21b) of the opening (20a, 20b) of the back wall (19) enclosing the guide-arm (13) and being spaced therefrom, the container (18) being provided with an essentially plate-shaped closing piece (22) that is parallel to the back wall (19), slidable on it and permanently covering the opening (20a, 20b) of the back wall (19), the closing piece (22) having another opening (24) confined by another rim (25), this other rim (25) of the other opening (24) provided in the closing piece (22) enclosing the guide-arm (13) in such manner that it can be slid in the direction of the longitudinal axis (15) of the guide-arm (13), first sealing means (32) being provided for establishing a slidable sealing between the closing piece (22) and the back wall (19), second sealing means (30, 31; 33) being provided for establishing a slidable sealing between the guide-arm (13) and the closing piece (22), and the uppermost of the two slides (6) being rigidly connected with a chucking fixture (8) for the workpiece (1) and with the back wall (19) of the container (18), characterized in that the closing piece (22) is arranged outside of the container (18) on a side (26) of the back wall (19) facing the stand (4), the lower of the two slides (7) is connected rigidly with the closing piece (22) and in relation to the stand (4) can only be moved parallel to the longitudinal axis (15) of the guide-arm (13), and in relation to the lower slide (7) the upper slide (6) can only be moved at a right angle to the longitudinal axis (15) of the guide-arm (13).

2. A machine for spark erosion cutting according to claim 1, characterized in that in its lower section on its side (27) facing the container (18) the closing piece (22) is provided with a duct (28), which is provided with a drainage connection piece (29).

3. A machine for spark erosion cutting according to claim 2, characterized in that the duct (28) is designed as a connecting element rigidly supporting the closing piece (22) on the lower slide (7).

4. A machine for spark erosion cutting according to claim 1, characterized in that the second sealing means for establishing the slidable sealing between the guide-arm (13) and the closing piece (22) include at least one bellows (30, 1) embracing the guide-arm (13) at least on part of its length, one end of the bellows (30, 31) being sealingly connected with the guide-arm (13) and the other end of the bellows (30, 31) with the closing piece (22).

5. A machine for spark erosion cutting according to claim 1, characterized in that for establishing the slidable sealing between the closing piece (22) and the back wall (19), the first sealing means (32) include at least two sealing pieces (34) arranged spaced from one another.

6. A machine for spark erosion cutting according to claim 5, characterized in that at least one of said sealing pieces (34) can be inflated by gas pressure.

7. A machine for spark erosion cutting according to claim 5, characterized in that several of said sealing pieces (34) are each integrally connected with a sealrng body (35) and fitted to it as a curved projection.

8. A machine for spark erosion cutting according to claim 7, characterized in that together with the sealing pieces (34) fitted to it the sealing body (35) forms a labyrinth seal.

9. A machine for spark erosion cutting according to claim 1, characterized in that the second sealing means are designed as sealing device (33) for establishing a slidable sealing between the guide-arm (13) and the closing piece (22) and include a sleeve (36) arranged fixedly on a side (37) of the closing piece (22) facing the stand (4) and embracing the guide-arm (13) with play, and at least two sealing pieces arranged in the sleeve (36) spaced from one another and embracing the guide-arm (13) in a sealing and slidable manner, the sleeve (36) cooperating at least with the two sealing pieces and the guide-arm (13) in order to define a sealing space enclosing the guide-arm (13).

10. A machine for spark erosion cutting according to claim 7, characterized in that gas pressure can be applied to the sealing space.

* * * * *